Patented Jan. 10, 1933

1,894,168

UNITED STATES PATENT OFFICE

HENRY A. GARDNER, OF WASHINGTON, DISTRICT OF COLUMBIA

PROCESS OF MODIFYING THE CHARACTERISTICS OF PIGMENTS, AND PRODUCT

No Drawing.   Application filed January 22, 1931. Serial No. 510,585.

The present invention relates to the treatment of pigments, and particularly of titanium-base pigments, whereby to improve or modify properties thereof: it relates, also, to the products obtained as a result of such treatment.

It is known that when the commercial titanium pigments now produced are ground in varnish liquids, and especially in tung oil varnishes which are highly polymerized and which may contain rosin esters, phenol-formaldehyde-rosin esters, glycerin phthalate resins, and/or similar resins, aging may sometimes cause either a stiffening of the product or a settling out of some of the solids, sometimes in the form of a hard cake. However, the greatest drawback of known paints made with titanium pigments is the pronounced chalking which they shown when exposed to the weather. Thus, for instance, when these pigments in the form of paints are exposed on wooden surfaces for a period of less than a year, pronounced chalking and washing may occasionally take place to such an extent that the wood is disclosed in many places. This makes it necessary at the present time to use in the paints, high percentages of zinc oxide, white lead, or other pigments with these titanium pigments in order to secure durable results. Since the hiding power of zinc oxide or white lead is much lower than that of titanium pigments when ground in oil it can be appreciated that paints of comparatively lower hiding power are produced.

An object of the present invention is to provide titanium-base pigments having materially reduced "chalking" tendencies. Another object of invention is to provide titanium-base pigments which when ground into a paint in varnish liquids such as a tung oil varnish show improved suspendability in the paint with decreased settling out.

The above and other objects of invention are attained by carrying out a process which consists essentially in enveloping the particles of titanium-base pigment with a film covering of a water-insoluble inorganic or organic compound. By the expressions "titanium-base pigment", or simply "titanium pigment", used therein, I mean to include pigments containing a substantial proportion of a titanium compound having pigmenting properties: I refer specifically to titanium oxide and to titanium oxide coalesced with barium sulphate, calcium sulphate, or a similar product. Pigments of this character are described in the patent disclosures of Barton and Rossi. Said pigments, in the forms in which they normally occur in commerce, may and usually do contain, in small amounts, acidic constituents, iron sulphate and/or titanium sulphate, or their products, as impurities.

In carrying out this process I may treat the titanium pigment suspended in a liquid vehicle, which may be water, with a small but effective amount of chemicals which will produce upon the surface of the titanium pigment a water-insoluble compound; or, I may coat the particles with a pre-formed water-insoluble substance in liquid state. Among the inorganic products with which I have experimented in this relation are: zinc phosphate, lead phosphate, barium selenide, silver carbonate, zirconium oxide, tin carbonate, zinc vanadate, lead tungstate and sulphur. Thus, in coating the particles with an inorganic compound 100 grams of the titanium pigment are suspended in water and sufficient appropriate chemical solutions are added to the water suspension to interact to the formation of a water-insoluble compound such as one of those above named, whereby there will be precipitated upon the surface of the inert titanium pigment about 5% of the said compound. In accordance therewith, to the aqueous suspension of 100 grams of the titanium pigment, e. g., ordinary commercial titanium oxide or the titanium oxide-barium sulphate pigment known by the name "Titanox", I may add a sodium salt of selenium and, thereafter, barium chloride, in amounts sufficient to produce insoluble barium selenide, with the result that the particles of the titanium pigment become coated with a film of the said barium selenide. Or, I may dissolve oxalic acid in water, suspend the titanium pigment therein, and thereafter add a suitable quantity of a water-soluble metallic salt capable of reacting with the oxalic acid to the formation of a water-insoluble oxalate, say lead acetate, thus producing lead oxalate.

Other organic compounds which I have utilized for this purpose include rubber latex which is precipitable on the surfaces of the particles by adding traces of acid. I have also experimented with rubber dispersions in benzol, which are precipitable by drying the pigment which is suspended in the rubber-benzol mixture. I have also experimented with ammoniated casein solutions which are precipitable upon the titanium pigment by mere heating or by the addition of traces of acid. A preferred procedure, however, is to use an alkali metal salt of a soap-forming acid. Among the soap-forming acids which are suitable are tung oil acids, linseed oil acids, stearic acid, ordinary rosin acids, and the acids from synthetic resins.

The invention will be described in great particularity in regard to the following specific examples:

*Example 1*

One hundred grams of ordinary commercial titanium oxide are stirred into 200 grams of water, more or less, containing 5 parts by weight of commercial soap, such as "Ivory" soap, the latter consisting essentially of alkali metal salts of oleic and stearic acids. The liquid is heated to about 200° F. for about 5 minutes. During this period, acid constituents of the titanium pigments, which are usually present in small amounts, such as iron sulphate or titanium sulphate, react with the soap, and thus become neutralized and no longer objectionable. These products, which are really responsible for many of the defects in titanium pigments as now produced, are thus removed from reaction. The mass is further heated for a period of five minutes, and there is then added sufficient zinc chloride, zinc sulphate, or other water-soluble zinc salt to precipitate any unacted upon portion of the "Ivory" soap, thus producing zinc oleate or zinc stearate which coats over the particles of pigment. The resulting product thereafter is filtered, washed and dried.

In place of the "Ivory" soap referred to above, I may use an equal quantity of sodium resinate produced by saponification of the alkali with ordinary rosin. The reaction proceeds in the same direction and a similar product is produced. In place of the titanium oxide I may similarly treat titanium-barium pigment, or titanium-calcium pigment.

The pigment product produced by the carrying out of the above process has a lower oil absorption than the pigment previous to treatment. This is due apparently to the washing out of the impurities in the titanium pigment or reaction therewith (which impurities cause the pigment to resist wetting with oil and which may cause settling in the container and washing and chalking of the paints when they are exposed) and to other phenomena, such as aggregation which may take place during the heating of the pigment in the soap solution.

The pigment, after washing and drying, when ground in oil produces a film-forming composition which may be kept for a long period of time without showing any pronounced settling or hardening. It also produces a paint which when exposed out of doors will not show nearly so much chalking for a period up to one year, as compared to a paint made with ordinary titanium pigment.

I have, for instance, made accelerated tests of paints produced with such pigments as compared to the pigments before treatment. These tests were made with alternate exposure to ultra-violet light from a quartz tube mercury vapor arc lamp and water spray in a specially designed cabinet. In this test, paints made with the ordinary pigments would chalk heavily in a period of three days' time, whereas the treated pigments would not show any marked chalking or disruption of the film after a period of eleven days. This period of eleven days may possibly be the equivalent of actual outdoor exposure for a period of eighteen months. This remarkable weathering obtained by pigments so treated with soaps is probably due to the extra resistance which these pigments have to wetting. For instance, the dry pigments after production will repel water in a manner heretofore unknown with respect to titanium pigments. This may be illustrated when small samples of my product are dropped into water. The particles do not sink immediately to the bottom but form spherical globular masses which seem to be coated with air bubbles. This phenomenon is a distinguishing characteristic of pigments treated in accordance with my process.

In regard to the oil absorption of these pigments, I wish to state that this treatment is quite remarkable in that it effects a reduction of the oil absorption to a very great extent. Thus, for instance, if 100 pounds of a titanium-barium pigment requires 16 pounds of linseed oil to thoroughly wet the surface and make a stiff paste, as low as 12 pounds of oil is sufficient therefor after the pigment has been coated over with zinc stearate or similar stearate according to my process. While much of this reduction of oil absorption is due to the presence of the stearated surface, it is also probable that the boiling treatment produces aggregation of the particles, which makes the pigment require less oil. The washing out or neutralization of the iron or titanium sulfates in the pigment also allows of a quick wetting with oil.

When working with a pigment known as calcium "Titanox", which consists of approximately 30% $TiO_2$ precipitated on 70% calcium sulphate, I find that the reaction between the soap solution and this pigment is immediate, and that the soap solution immediately unites with the particles of pigment which possibly may contain some free lime. At any rate, the particles are coated over with what appears to be calcium stearate or other metallic stearate.

*Example 2*

I heat 100 grams of calcium "Titanox" and 200 grams of water which contains 5 grams of "Ivory" soap. Within two or three minutes the soap is entirely taken out of solution and precipitated on the calcium "Titanox" in an insoluble metallic soap form. No zinc sulphate or other reagent is required to precipitate. The pigment thus produced is quite remarkable in its properties. It is extremely white. It repels water tremendously. This makes it possible to use this pigment for outside paint, a place where it has heretofore been unused to any extent because of its slightly water soluble properties which cause the paint to chalk off quickly.

A similar improvement of titanium-base pigment is effected by deposition on the particles thereof of a water-insoluble inorganic compound such as those hereinbefore noted.

In place of the soaps and/or inorganic compounds to which I have previously referred, I may coat over the particles of a titanium pigment with beta elæostearin which will form during the coating process. Beta elæostearin is produced from ordinary tung oil by the effect of light. This product is described in Circular No. 256, Henry A. Gardner and H. C. Parks, Scientific Division, Educational Bureau, Paint Manufacturers' Association of the U. S., 1925. It has unique properties in that after being formed and dried, it becomes insoluble in oil and practically all solvents. By the following process I successfully coat the particles of pigment with this material in order to waterproof them and obtain a waterproofing that is highly insoluble.

*Example 3*

100 grams of tung oil (China-wood oil) are placed in a container, and there is added thereto a trace of sulphur or iodine. Usually 0.1% is sufficient. This tung oil is placed under strong light, such as the irradiation from carbon arcs or mercury quartz tubes, for a period of twenty minutes. During this period beta elæostearin is induced. The oil is still clear, but if it were allowed to cool it would become a solid white mass as stiff as wax. This phenomenon is due to the large quantity of beta elæostearin which has been formed in the oil by the action of the light. Before the oil is allowed to cool, I add it, drop by drop, to 2000 grams of "Titanox" which is constantly being stirred in a mechanical device. By this method the oil coats over the particles of pigment to a very great extent. The pigment is then spread out on paper and allowed to dry for a period of a few hours, during which time the beta elæostearin becomes solid and insoluble.

In order to make the coating-over process, as outlined above, more perfect, I may dissolve the 100 grams of the so-treated tung oil product consisting essentially of beta elæostearin in 100 grams or more of a solvent such as acetone, in which it is soluble while hot and just after its treatment. This allows the tung oil product to be spread over a greater area of pigment. During the mixing operation the acetone or other solvent evaporates, leaving a very thin film of the tung oil product on the pigment.

The pigment thus produced is highly waterproof. It has a lower oil absorption than the original pigment. The pigment and its coating are insoluble in oil and other ordinary solvents for oil. When made into a paint, this pigment has very great durability, and does not require zinc, lead, or other pigments to prevent rapid chalking.

I have discovered, also, that this use of beta elæostearin is not restricted to titanium-base pigments, but includes all dry pigments, whether white or colored, of any composition whatsoever. I have found that the waterproofness of a dry pigment may be improved and that its oil absorption ratio may be lowered by coating the particles thereof with beta elæostearin in either of the manners above described with relation to a titanium-base pigment. Included in the class "dry pigments" I may mention white lead carbonate or sulphate, lithopone and other zinc sulphide pigments, zinc oxide, natural iron earth pigments such as ochre and sienna, and all chemically precipitated or manufactured pigments such as Prussian blue, Para red, lead chromes, and the like.

I claim:

1. Process which comprises coating the surfaces of particles of a pigment with a film-coating of beta-elæostearin.

2. As a new product, a white pigment comprising a titanium compound having pigmenting properties, the particles of which pigment are coated with beta-elæostearin.

3. Process which comprises adding a dry pigment, by portions and with thorough mixing, to a liquefied organic mixture consisting essentially of beta-elæostearin.

4. Process which comprises adding a dry pigment, by portions and with thorough mixing, to a solution of beta-elæostearin in a suitable volatile organic solvent therefor, and removing the solvent.

5. As a new product, the pigment product obtained by the carrying out of the process defined in claim 3.

6. As a new product, the pigment product obtained by the carrying out of the process defined in claim 4.

In testimony whereof, I affix my signature.

HENRY A. GARDNER.